Oct. 19, 1943.  E. J. LEX  2,332,326
TWO-WHEELED TRAILER
Filed Aug. 20, 1941  5 Sheets-Sheet 1
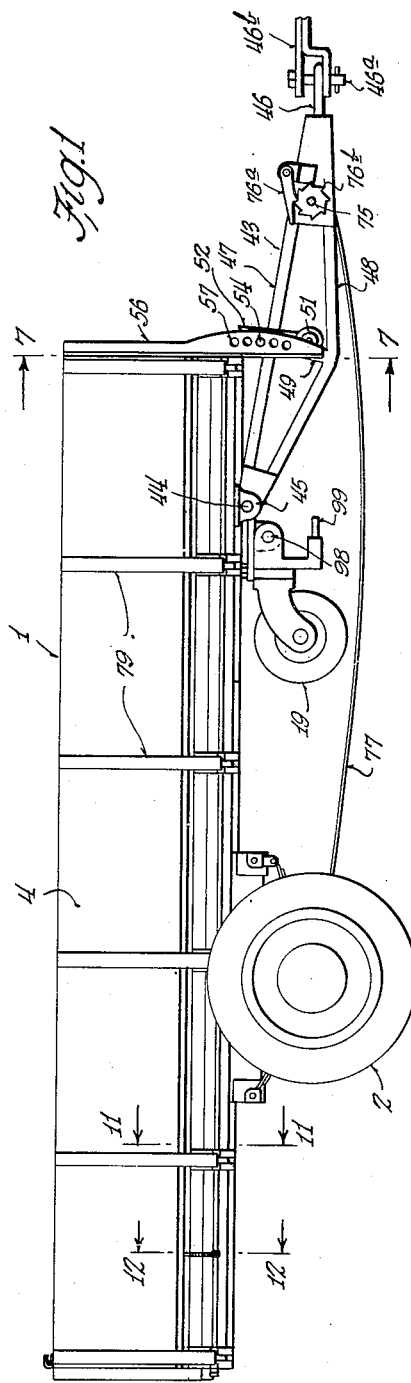
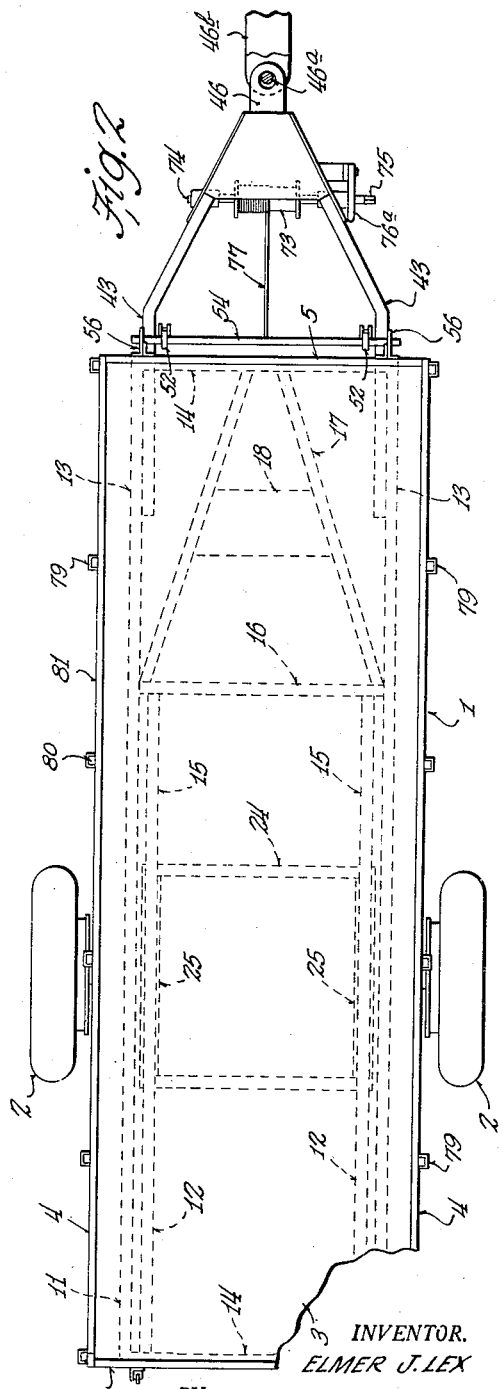
INVENTOR.
ELMER J. LEX
BY
ATTORNEY

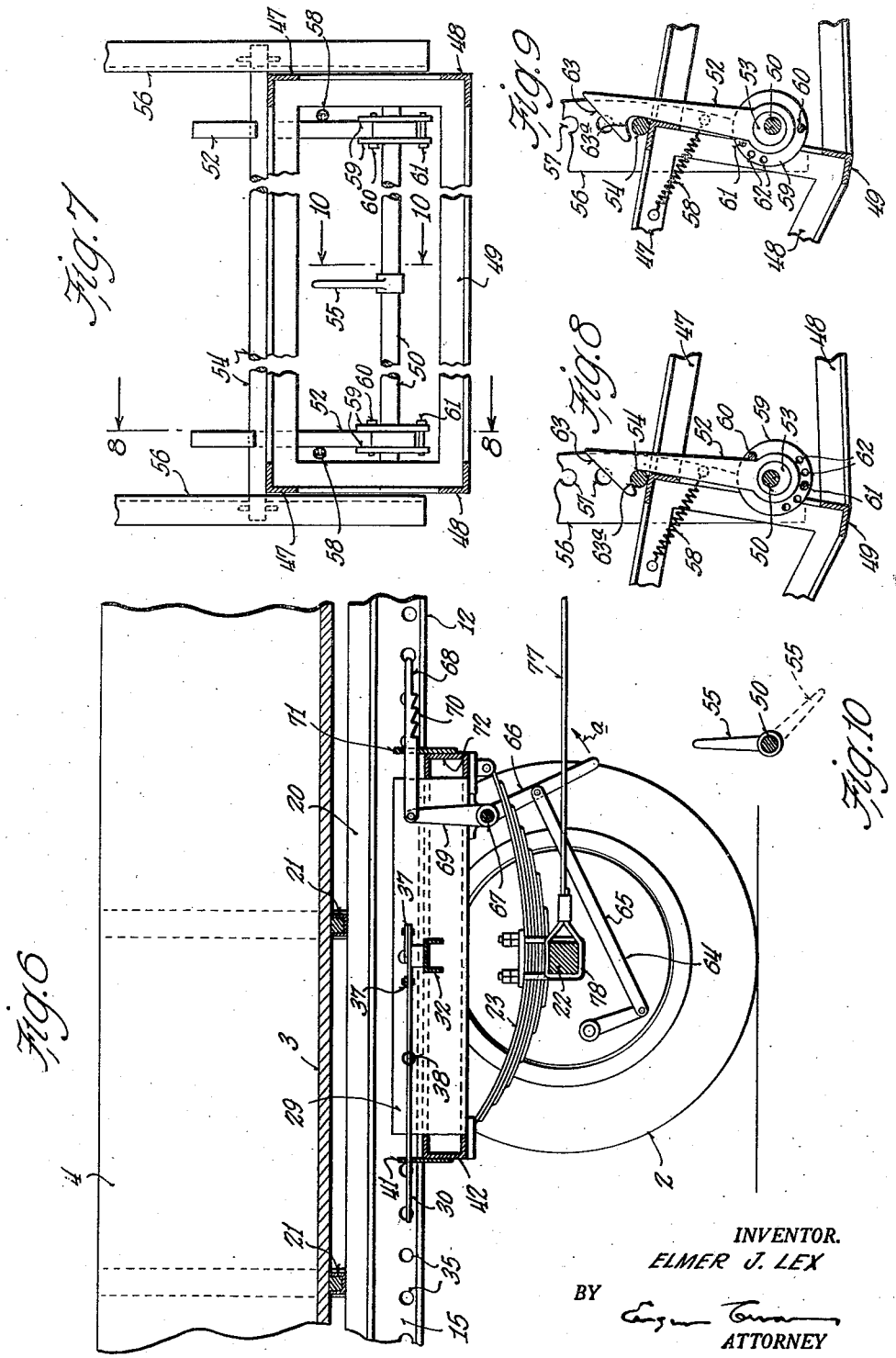

Oct. 19, 1943.   E. J. LEX   2,332,326
TWO-WHEELED TRAILER
Filed Aug. 20, 1941   5 Sheets-Sheet 3
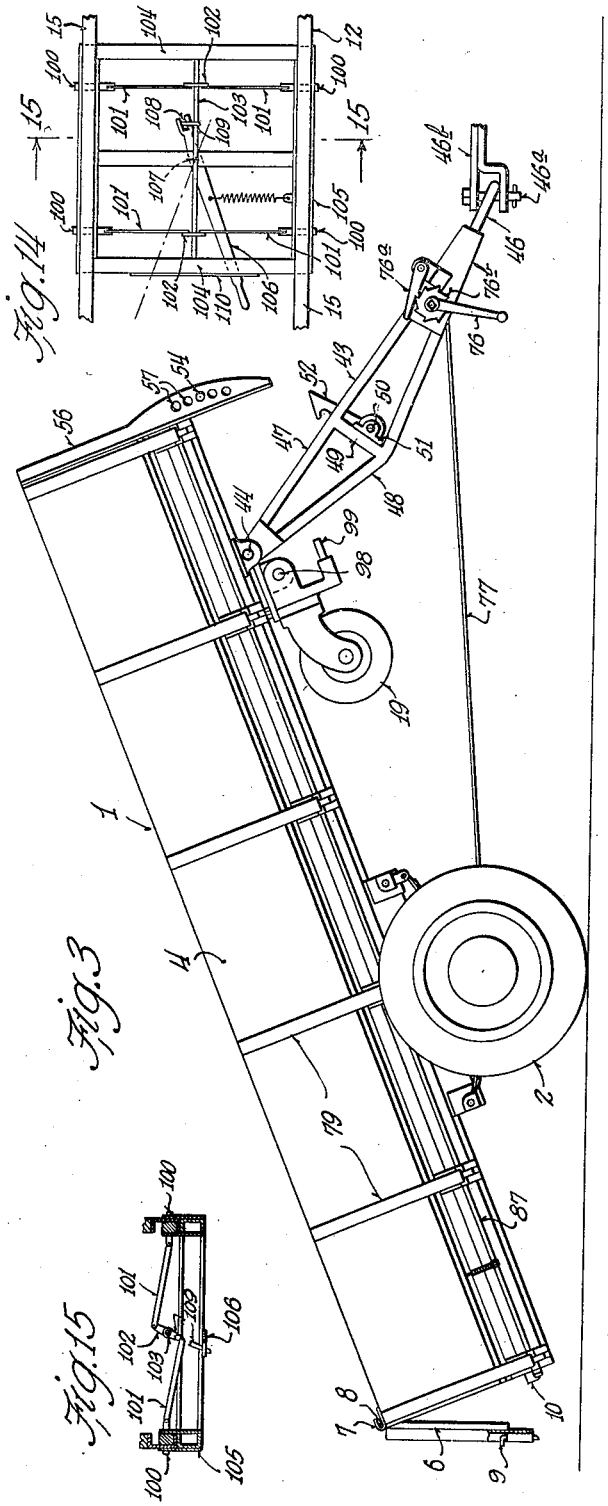
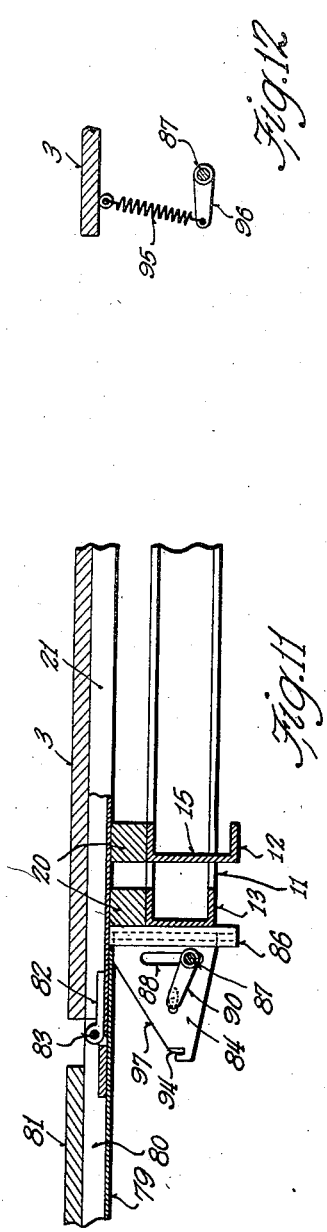
INVENTOR
ELMER J. LEX
BY
ATTORNEY

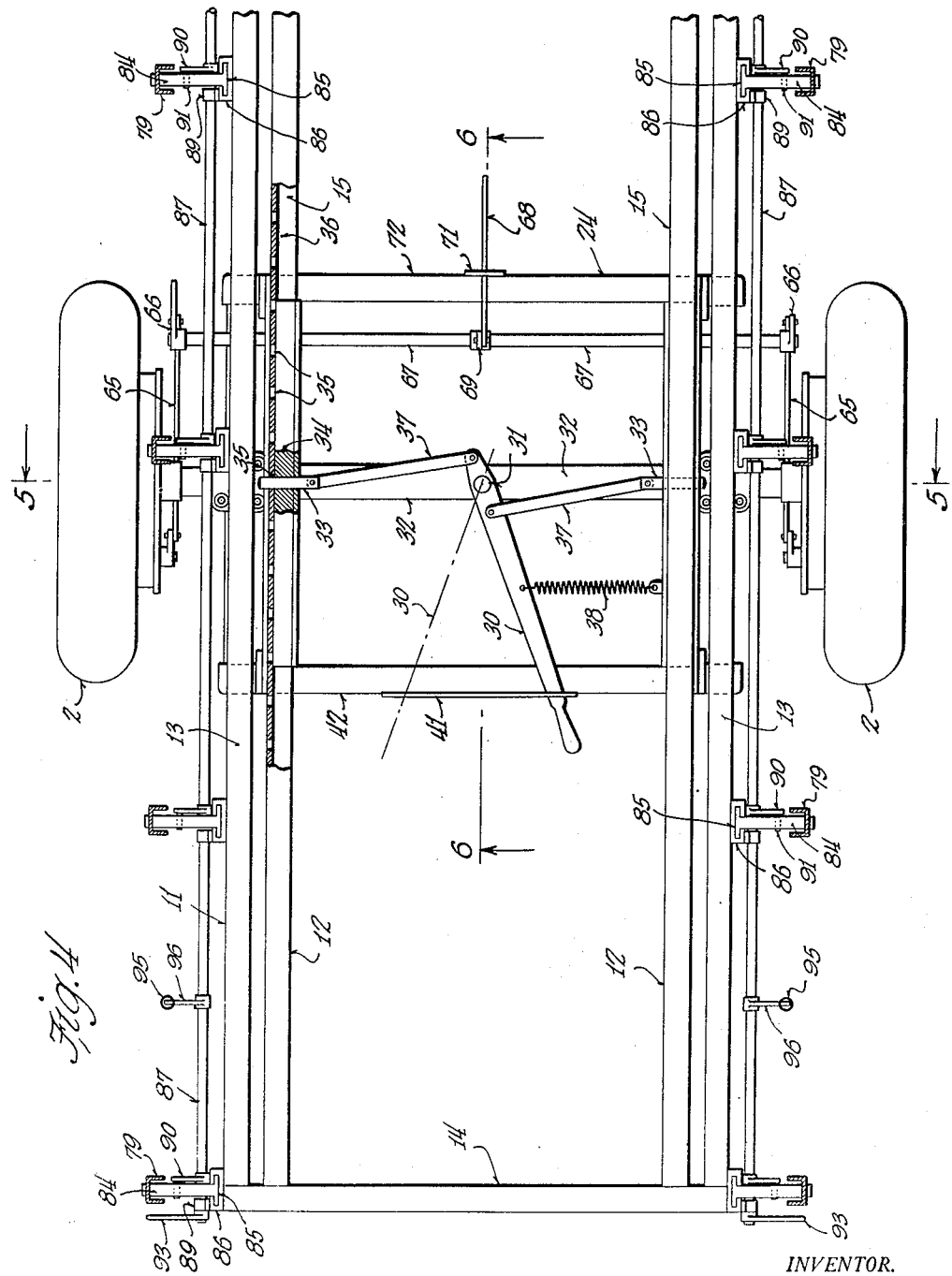

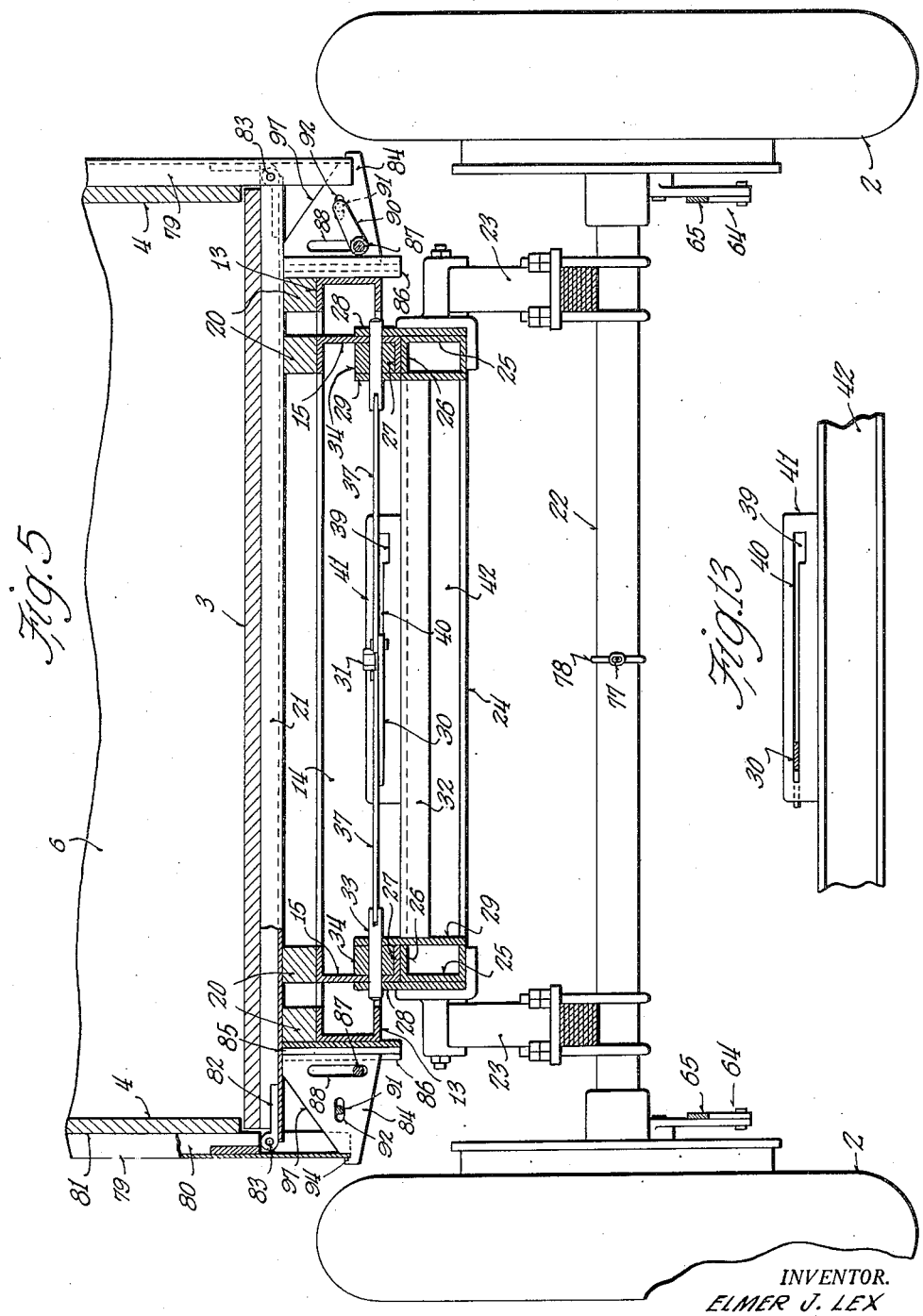

Patented Oct. 19, 1943

2,332,326

UNITED STATES PATENT OFFICE 2,332,326

TWO-WHEELED TRAILER

Elmer J. Lex, Milwaukee, Wis.

Application August 20, 1941, Serial No. 407,523

5 Claims. (Cl. 280—33.4)

This invention relates to a two-wheeled farm or industrial trailer attachable to a power driven draft unit in the form of a tractor, motor truck or the like for hauling various types of loads.

The principal purpose and object of my invention is to provide a two-wheeled trailer in which the wheel assembly for supporting the trailer body is adjustably connected thereto for adjustment longitudinally of the trailer body to either balance the load carried by the trailer body on the wheel assembly or shift at least a portion of the weight of the load to the draft unit attached to the trailer for giving the draft unit sufficient traction to move the trailer and its applied load.

A further object of my invention is to have the trailer body tiltable into and out of its dumping position about the axis of the wheel assembly and utilize the adjustable connection aforesaid to adjust the axis about which the body is tilted at the desired point in the length of the trailer body as may be best suited for any given load.

Further objects of my invention are as follows:

To provide for the adjustment referred to by having the frame of the wheel assembly in sliding connection with the frame of the trailer body and provide a manually operable locking mechanism for releasably locking the said frames in their adjusted positions;

To provide said locking mechanism with locking bolts at the opposite sides of the trailer and wheel assembly frames and have means for simultaneously actuating the bolts in locking and unlocking the frames;

To provide the trailer with a pivotally mounted hitch frame so that the lever of the outer end of the hitch frame at its connection with a draft unit may be adjusted for connection with either a tractor or a motor truck thereby adapting the trailer for use with either of these forms of draft device;

To utilize the pivoted hitch frame in moving the trailer body into and out of its tilted or dumping position about the axis of the wheel assembly and provide a locking arrangement for holding the trailer body tilted for the more effective discharge and spreading of the load on moving the trailer by the draft unit while the trailer body is in its tilted or dumping position;

To provide a drum and cable arrangement at the hitch frame for manually tilting the trailer body into its dumping position as when the draft unit is not used for such purpose;

To provide an improved form of latch means at the hitch for holding the trailer body in its lowered or load-carrying position; and To provide an improved form of hinged mounting for the side walls of the trailer body and latch means therefor for converting the trailer body into a box type or a platform type depending on the type of load to be carried by the trailer body.

The invention consists further in the features hereinafter described and claimed.

In the accompanying drawings illustrating a preferred embodiment of my invention—

Fig. 1 is a side elevational view of my improved two-wheeled trailer with the trailer body shown in its lowered or load carrying position;

Fig. 2 is a top plan view of the trailer as shown in Fig. 1, the dotted lines indicating generally the wheel, hitch and chassis frames, respectively;

Fig. 3 is a side elevational view of the trailer with the trailer body tilted to its dumping position about the axis of the wheel assembly;

Fig. 4 is a top plan view on a larger scale of the rear portion of the trailer frame to show the adjustable connection between the trailer frame and wheel assembly frame and the locking mechanism therefor, the trailer body being omitted for the sake of illustration and the parts being broken away and in section, respectively;

Fig. 5 is a vertical sectional view taken on line 5—5 of Fig. 4 to show details of construction;

Fig. 6 is a fragmentary longitudinal sectional view taken on line 6—6 of Fig. 4 to show additional details of construction;

Fig. 7 is a vertical sectional view taken on line 7—7 of Fig. 1 to illustrate some of the details of the hitch device;

Fig. 8 is a vertical sectional view taken on line 8—8 of Fig. 7 to show one of the latch members for holding the trailer body in its lowered or load carrying position;

Fig. 9 is a similar view of the same parts, but showing the latch member partially released from its latch bar;

Fig. 10 is a vertical sectional view taken on line 10—10 of Fig. 7 to show the operating handle for said latch mechanism;

Fig. 11 is a vertical sectional view taken on line 11—11 of Fig. 1 and showing a side wall of the trailer body lowered to its platform providing position;

Fig. 12 is a similar sectional view taken on line 12—12 of Fig. 1 to show the actuating shaft and its spring employed in locking mechanism for holding the side walls of the trailer body in either raised or lowered position;

Fig. 13 shows the guide bracket for the hand lever of the locking bolts employed to releasably connect the wheel frame to the main frame of the trailer body;

Fig. 14 is a top plan view of a modified form of bolt locking mechanism for the wheel assembly and trailer frames to be later described; and Fig. 15 is a vertical sectional view taken on line 15—15 of Fig. 14.

In the drawings, 1 indicates the trailer body and 2, 2 the supporting wheels therefor. The body is preferably of the box type having a bottom wall or floor 3, side walls 4, 4 and front and rear walls 5, 6 respectively, as best shown in Fig. 2.

The side walls 4 are hingedly connected with respect to the bottom wall 3 and may occupy either upright positions with respect to the bottom wall when a box body is required as shown in Figs. 1, 2, 3, 5 and 6 or may be swung down to a horizontal position in substantially co-planar relation with the bottom wall 3 when a platform type of body is required as indicated in Fig. 11. The hinged mounting and the locking mechanism for holding the side walls 4 either raised or lowered will be described later.

The front wall 5 is preferably rigid in its relation to the bottom wall 3, whereas the rear wall 6 may be in the form of a hinged or pivoted tail gate as shown in Fig. 3. In this connection the gate 6 is releasably connected to the rear ends of the side walls 4 when the latter are in their upright or raised positions and at which time the tail gate is employed. The connection is indicated generally in Fig. 3 and comprises loop-shaped brackets 7 carried by the side walls 4 and engaged by trunnions 8 carried by the gate 6. One or more latch bolts 9 may be provided on the gate 6 to hold the latter in its closed position, said bolts being engaged with suitable keepers 10 carried either by the bottom wall 3 or by its supporting frame to be next described.

The frame just referred to is located beneath the body 1 and as shown in dotted lines in Fig. 2 comprises a main frame 11 and a supplemental frame 12, one located inside of the other. The main frame 11 has a pair of substantially parallel side members 13, 13 which extend substantially the full length of the trailer body 1 and are connected together at their opposite ends by cross-members 14, 14. The several members are preferably of channel form and are arranged with the channels opening inwardly as indicated in Fig. 5.

The supplemental frame 12 also has side members 15, 15 parallel to each other and to the side members 13 of the main frame. The side members 15 are rigidly secured to the cross-member 14 at the rear end of the trailer body and extend forwardly therefrom for at least two-thirds of the length of the trailer body as indicated in Fig. 2. The length of the side members 15 is sufficient to accommodate the full extent of the adjustment which my invention provides for the trailer wheel assembly along the length of the trailer body. This feature will be described later. The side members 15 terminate at and are secured to a cross-member 16 of the main frame 11 and from this point on towards the front end of the trailer body the supplemental frame comprises a suitable truss-like frame structure indicated generally at 17 in Fig. 2. I may remark at this point that the frame structure 17 includes a mount 18 for a third wheel 19. The latter is preferably of the caster type as common in this art.

As shown in Fig. 5, the side members 15, 15 of the supplemental frame are also of channel form. These members are arranged with their channels opening inwardly and in addition are disposed with their upper flanges in co-planar relation with the corresponding flanges of the side members 13 of the main frame so that the trailer body may be supported by both frames through sills 20 and cross-members 21. The parts are secured together in the relation shown, the cross-members 21 being spaced along the length of the trailer frames 11 and 12 and have the floor or body wall 3 of the trailer body secured thereto. The fastening elements used in this connection are well understood and are not shown herein. The cross-members 21 extend beyond the opposite side edges of the floor 3 and support the hinged mounting for the side walls 4 of the trailer body as will presently appear. Suitable brackets (not shown) may be interposed between the side members 13, 15 of the respective frames 11 and 12 to keep the side members in spaced relation. In the embodiment shown this is accomplished by the cross-members 21 and the sills 20, one secured to each side member 13, 15.

The wheels 2 are a part of the wheel assembly which includes an axle 22, suspension springs 23 and a top frame indicated generally at 24 (see Fig. 2). The frame 24 is below the supplemental frame 12 and has its channel-shaped side members 25, 25 immediately below and in sliding contact with the side members 15 of the frame 12. This is clearly shown in Fig. 5, and it will be noted that the upper flanges 26 of the side members 25 engage against the lower flanges 27 of the side members 15. Inner and outer plates 28, 29 at each side of the wheel frame 24 maintain the side members 15 and 25 in sliding engagement. The plates 28 are on the outer sides of the frame members 15 and 25 and overlap both of the same to the extent desired. The plates 29 are on the inner sides of the frame 24 and overlap both frame members 12 and 25 as shown. The plates 28 and 29 are rigidly secured to the associated side members 25 and in overlapping the side members 15 provide in effect upwardly extending channels to receive the lower portions of the associated side members 15. Hence, the wheel assembly as a distinct unit may be adjusted lengthwise of the supplemental frame 12 by reason of the slidable mount which is provided for the frame 12 on the wheel frame 24.

To lock the wheel assembly in any of its adjusted positions along the length of the supplemental frame 12, I provide a manually operable bolt mechanism one form of which is detailed in Figs. 4 and 5. On referring to Figs. 4 and 5, it will be noted that this locking mechanism comprises a main operating lever 30 fulcrumed at 31 on a cross-member 32 forming a part of the wheel frame 24. Bolt elements 33, 33 are slidably mounted in block members 34 located in the channels of the side members 15 of the supplemental frame at each side of the wheel frame 24. These block members 34 are secured to the inner plates 29 so as to move along the side members 15 when adjusting the wheel assembly with respect thereto. The bolt elements 33 are engageable with any one of a number of oppositely alined bolt receiving apertures 35 in the vertical webs 36 of the side members 15 of the supplemental frame 12 so as to lock the wheel assembly in any of its adjusted positions along the length of the supplemental frame. It is to be understood that the bolt elements 33 extend through the guide plates 28, 29, the latter being apertured for the purpose as shown. Links 37, 37 connect the bolts 33 with the operating lever 30 on opposite sides of its fulcrum whereby the bolts will be moved simultaneously in locking and unlocking the frames 12 and 24.

When the lever 30 is in the full line position as shown in Fig. 4, the bolts 33 will be engaged with the selected bolt holes 35 in the side members 15 in the supplemental frame and the wheel assembly will be locked to the supplemental frame in such position of adjustment. A contractile spring 38 connects the lever 30 to one of the side members 25 of the wheel frame 24 and normally holds the bolts 33 in their locking positions. When the lever 30 is swung to the dotted line position shown in Fig. 4, the bolts 33 will be withdrawn out of the bolt holes 35 and the wheel assembly may be adjusted lengthwise of the supplemental frame. To hold the lever 30 in this position against the return action of the spring 38, the outer end of the lever 30 cooperates with a notch 39 at one end of a guide slot 40 in a bracket 41 for the lever as shown in Figs. 5 and 13. The bracket 41 is preferably mounted on the adjacent cross-member 42 of the wheel frame 24. In the embodiment shown the cross-member 42 is at the rear end of the wheel frame.

The next feature of the invention has reference to the hitch construction with which the forward end of the trailer is provided for attaching the trailer to a power driven draft unit, either a tractor or a motor truck.

As shown in Figs. 1 and 2, the hitch extends forwardly beyond the front end of the trailer body 1 and comprises a hitch frame made up of a pair of side elements 43, 43 fulcrumed at their inner ends at 44 to brackets 45 secured to the underside of the main frame 11 adjacent to the front end of the trailer body. The side elements 43 are so fashioned as to come together at their forward ends and are there provided with a draw bar 46 engaged by a hitch bolt 46a forming a part of the draft fixture 46b at the rear end of the tractor or motor truck as the case may be. With the hitch frame 43 pivotally connected to the trailer frame, the outer end of the hitch frame at the bar 46 may be raised or lowered to the level required for attaching to either a tractor or a motor truck. Usually the draft fixture 46b of a tractor is at a lower level than the corresponding fixture of a motor truck. In that event the level of the hitch device is adjusted, thus making my improved trailer usable with either form of draft unit.

The side elements 43 of the hitch frame are preferably in truss-like form comprising upper and lower angle members 47, 48 which support an open frame element 49 intermediate the length of the side elements 43 as shown in Figs. 1, 3 and 7. The frame 49 provides a support for a shaft 50, the brackets for journalling the shaft on the frame being indicated at 51. The shaft 50 carries a pair of latch elements 52, 52 mounted on eccentrics 53 fixed to the shaft as shown in Figs. 8 and 9. These eccentrics serve to raise and lower the latch members 52 in respect to a cross bar 54 in the turning of the shaft 50 by a handle element 55. When the handle 55 is in its upright postion as shown in full lines in Figs. 7 and 10, the latch members 52 are in locking engagement with the bar 54 as shown in Fig. 8. At this time the latch members hold the trailer body 1 in its lowered or load carrying position as shown in Figs. 1 and 2.

The bar 54 extends between a pair of angle members 56, 56 at the front end of the trailer body and rigidly secured to and rising upwardly from the cross-member 4 of the chassis frame 11 at the front end of the trailer body. The members 56 extend below the frame 11 on the outer sides of the side elements 43 of the hitch and are there each provided with a row of openings 57 to accommodate the opposite ends of the latch bar 54. The holes 57 are arranged in an arc of a circle the center of which is the pivot 45 of the hitch frame so that the latch members 52 will cooperate with the bar 54 in any position of its adjustment along the members 56. With this arrangement it is possible to adjust the level of the outer end of the hitch frame for either a tractor or a motor truck without displacing the inter-connection between the latches and the bar.

The latch members 52 are normally urged toward the bar 54 by spring elements 58 included in the latch construction. Each latch member 52 is provided at its connection with the eccentric 53 with a pair of circular discs 59, 59 between which extend two pins 60, 61. The pin 60 is fixed in position in respect to the discs while the pin 61 may be adjusted to a number of positions about the axis of the shaft 50 by providing the disc with a number of pin receiving openings 62 as shown in Figs. 8 and 9. When the shaft 50 is turned in a clockwise direction the eccentrics 53 raise the upper ends of the latches 52 above and out of locking engagement with the bar 54 as shown in Fig. 9. A continued rotation of the shaft 50 brings the pin 61 against the inner edges of the latches 52 and swings them away from the bar to release the trailer body from the hitch frame. This will be apparent from Fig. 9. The pin 61 through the holes 62 may be set at the proper point for giving this releasing movement. Releasing the latches from the bar 54 frees the trailer body 1 for movement into its tilted or dumping position as will presently appear. After the trailer body has been unlocked and given movement towards its dumping position, the hand lever is released and the springs 58 return the latches to their bar engaging positions as shown in Fig. 8. In Fig. 10, I have shown the limit of movement of the handle 55 in raising and lowering the latch members by the eccentrics. The springs reset the latch members 52 to be in the path of the bar 54 when the trailer body is swung downwardly, the pins 60 acting against the outer side edges of the associated latch members 52 in this operation and holding the latch members against the front side of the frame 49 as shown in Fig. 8. The upper end portions of the latch members 52 are provided on their inner sides with inclined or camming surfaces 63 so that the bar 54 may ratchet over the latch members when the trailer body is lowered to its load carrying position. The under sides of the heads of the latch members 52 are notched as at 63a to engage over the cross-bar 54 when the trailer body is lowered and thus hold the trailer body in its lowered position. The springs 58 allow the latch members to yield in the ratcheting of the bar 54 thereover.

To move the trailer body into and out of its tilting or dumping position as shown in Fig. 3, I may utilize the power of the draft unit or the cable arrangement herein disclosed. When using the power of the draft unit the brake elements of the wheels 2 are engaged or set to lock the wheels against turning about the axle 22. The weight of the trailer plus the load carried thereby is sufficient to hold the wheels against slipping when the draft unit is backed up under its own power after the brakes of the wheels have been set and the latch members 52 have been released from the bar 54. The purchase provided by the locked wheels 2 enables the draft unit to tilt the trailer body to its dumping position about the axis of the wheels when the draft unit is backed up. The hitch frame 43 swings on its pivots 45 and applies the power of the draft unit to the trailer body. The connection between the hitch frame and the draft unit at 46, 46a and 46b is sufficiently flexible for this purpose.

To return the body to its lowered or load carrying position the draft unit is moved forwardly until the trailer body comes down to the hitch frame.

The actuating mechanism for the brakes of the wheels is indicated generally at 64 in Figs. 5 and 6. The links 65, 66 of this mechanism are connected for operation in unison through a rock shaft 67 carried by and extending cross-wise of the wheel frame 24 as shown in Figs. 4 and 6. One link 66 may provide an operating hand lever for setting and releasing the brakes. When this lever is drawn forwardly as in the direction of the arrow a in Fig. 6 the brakes of the wheels 2 will be set and they are maintained in that relation through a latch element 68 which is connected to the shaft 67 by an interposed arm 69. The underside of the latch 68 is serrated to provide teeth 70 which engage with a keeper 71 secured to and carried by the forward cross-member 72 of the wheel frame 24. To release the brakes the latch 68 is raised from the keeper 71 to release the teeth therefrom whereupon the actuating mechanism for the brakes is operated to release them. It may be noted here that the wheel assembly 2 is of the motor vehicle type having inflatable pneumatic tires for the wheels and internal expanding brakes therefor as in structures of this general character. The fact is that the running rear defined as the wheel assembly is purchased on the market as a complete and separate unit. The same is true of the caster wheel assembly 19.

The cable arrangement heretofore referred to comprises a drum 73 mounted on a shaft 74 journalled in the forward portion of the hitch frame 43 as shown in Fig. 2. One end of the shaft 74 is arbored as at 75 to receive a crank handle 76 (Fig. 3) for turning the drum to wind up the cable thereon when moving the trailer body 1 into its tilted or dumping position by the cable means. A gravity acting pawl 76a and co-operating ratchet wheel 76b are included in the drum construction to hold the trailer body in its tilted position. The cable 77 extends rearwardly from the drum beneath the trailer frame and is anchored at 78 to the axle 22 as shown in Fig. 6. The other end of the cable is anchored to the drum so that the cable when wound up on the drum will tilt the trailer body through the upward force exerted thereon through the hitch frame 43.

It is not necessary to set the brakes of the wheels 2 when tilting the trailer body to its dumping position by the cable 77. The draft unit is retained stationary and the cable is wound up on the drum to draw the wheels towards the draft device. This shortens the distance between the wheels 2 and the draft device and as a result the hitch frame 43 pivots to tilt the trailer body, the latches 52 of course having first been released from the bar 54. With the pawl and ratchet arrangement the trailer can be moved with its body 1 in this tilted position for better discharge and spreading of the load. The degree of tilt given to the trailer body for dumping is regulated by the extent to which the cable 77 is wound up on the drum 73. To lower the trailer body the cable is unwound from the drum as is apparent.

The side walls 4 of the trailer body are equipped with stake-like members 79 preferably in the form of metal channels containing wooden inserts 80 to which the board members 81 of the side walls 4 are secured. Similar inserts may be used with the cross-members 21 for securing the body floor 3 thereto. The members 79 are at the opposite ends of the cross-members 21 and are long enough to extend below the bottom wall 3 when the side walls 4 are in their upright positions. This is shown in Fig. 5 and which figure also indicates that the members 79 are pivotally connected to the associated cross-members 21 by hinge elements 82. The latter are fixedly secured within the channels of the members 21 and 79 and are interconnected by hinged pins 83.

The arrangement described enables the side walls 4 to be swung about the hinge pins 83 from their upright positions shown in Figs. 1, 3 and 5 to their lower or horizontal positions shown in Fig. 11. In the latter position the side walls 4 are substantially co-planar with the floor 3 of the trailer body and the latter is at this time converted into a platform as may be required for hauling hay, lumber, etc. A locking mechanism is provided for holding the side walls 4 either raised or lowered. This locking mechanism is constructed as follows:

Arrangement beneath the trailer body 1 at each stake element 79 is a latch member 84. These latch members are in the form of triangular shaped elements each having a T-head 85 along its inner end and engaged in a channel bracket 86 secured to the associated side member 13 of the main frame 11 as detailed in Fig. 4. This arrangement enables the latch members 84 to be moved vertically. For this purpose, I provide a shaft 87 one along each side of the trailer body for the respective sets of latch members 84. Each shaft 87 extends through vertically elongated slots 88 in its associated set of latch members and is journalled in brackets 89 carried by the channel fixtures 86. At each latch member 84 the shaft 87 is provided with a crank arm 90 extending outwardly from the shaft and having a crank pin 91 adjacent to its outer end which pin works in a horizontal slot 92 in the associated latch member 84 as shown in Fig. 5. By this arrangement the latch members 84 may be slid upwardly and downwardly in unison on turning their respective shafts by crank handles 93 as shown in Fig. 4. These handles are preferably located at the rear end of the trailer frame for convenient accessibility. When the cranks 93 are moved downwardly the pins 91 slide the latch members 84 downwardly releasing the hold of the latch members on the lower ends of the stake elements 79. It will be observed from Fig. 5 that each latch member 84 is provided adjacent its outer end with a notch 94 to engage the lower end of the stake element 79 and thus lock the latter in its upright position. Each shaft 87 is equipped with one or more return springs 95 for normally raising the latch members 84 to their uppermost or locking positions.

To release the side members 4 for movement into their lowered or horizontal positions as shown in Fig. 4 the shafts 87 are turned in a direction to slide the latch members downwardly. This carries the notches 94 from the lower ends of the stake elements 79 and the walls 4 of the trailer body may then be swung downwardly into their lowered horizontal positions. The lower ends of the stake elements 79 telescope with the adjacent ends of the cross-members 21 at this time and serve to hold the side walls 4 horizontal. To guard against upward swinging of the side walls, the springs 95 raise the latch members 84 into abutting relation with the lower ends of the stake elements 79 and hold the side walls 4 lowered as shown in Fig. 11. Fig. 12 indicates that each shaft 87 has an arm 96 to which the lower end of its spring 95 is attached. The other end of the spring is attached to the floor 3 of the trailer body or other permanent part. It will be observed from Figs. 5 and 11 that the upper edges 97 of the latch members 84 are inclined or beveled so that the lower ends of the stake elements 79 may ride the latch members when swinging the side walls 4 of the trailer body into their upright positions. To release the stake elements for this action the levers 93 are swung downwardly to move the latch members 84 out of abutting engagement with the under sides of the stake elements as will be apparent from Fig. 11.

The caster wheel 19 has pivotal connection as at 98 with the forward section 17 of the supplemental frame 12 so that said wheel may be swung from its raised position shown in Figs. 1 and 3 to a position for supporting the forward end of the trailer body when the hitch is disconnected from the draft unit. Suitable means will be provided for locking the wheel in its raised position, there being a pin element 99 carried by the caster wheel assembly and engageable with the frame of the trailer for holding the wheel in its operative position when supporting the forward end of the trailer body.

The modified form of locking mechanism shown in Figs. 14 and 15 provides four locking bolts, one adjacent to each of the four corners of the wheel assembly frame instead of only two bolts, one at each side of said frame as shown in Figs. 4 and 5. While the two bolt arrangement is adequate, yet the four bolt arrangement provides for more rigidity and less likelihood of the wheel frame canting on a force being applied to adjust it.

In Figs. 14 and 15, the four bolts are marked 100. The latter are at the outer ends of links 101 which are connected at their inner ends with rock arms 102 fixed to a common actuating shaft 103 journalled in the end members 104, 104 of the wheel frame 105. The arms 102 extend above and below the shaft 103 and have their opposite ends connected to the links above and below the shaft axis as shown. With this arrangement moving the arms 102 in one direction withdraws the bolts 100 from the bolt holes in the supplemental frame 12. The reverse movement engages the bolts in said apertures, the action being simultaneous. In this respect the structure follows that as detailed in Fig. 5.

Arranged below the shaft 103 is an actuating lever 106 pivoted at 107 on a part of the wheel frame 105. The lever 106 extends beyond one end of the wheel frame for accessibility and is provided at its opposite end with a yoke 108 which engages an arm 109 extending downwardly on the shaft 103. With the arrangement shown the four bolts 100 may be operated from the single lever 106. A keeper plate 110 may be provided for guiding the lever 106 and holding against a return movement when the bolts are in unlocking position as indicated by the broken line position in Fig. 14. This lever has a spring for the same purpose as the lever 30.

In both forms of locking mechanisms, the actuating levers 30 in Figs. 4 and 5 and 106 in Figs. 14 and 15 may be connected with a cable which may extend to the cab of the draft unit for operation from that point instead of requiring the operator to reach under the trailer assembly to operate the levers.

It is thought that sufficient has been said in connection with the description of the parts to indicate the uses and advantages of my improved two-wheeled trailer construction. Briefly, however, it may be pointed out that when the trailer body 1 is utilized for carrying a load that the body element is locked in its lowered or horizontal position by the latch members 52 at the hitch frame. The wheel assembly due to the slidable connection with the trailer frame may be adjusted to the position best suited to balance the load or shift some of the weight of the load to the draft device to give it the necessary traction to move the loaded trailer or to locate the pivotal axis at the most desirable point in the length of the trailer body for tilting the same for dumping. In connection with the first feature the wheel assembly is adjusted to equalize the load placed on the trailer body in respect to the wheel assembly. This distributes the weight of the load on the roadway and makes for more efficient and effective haulage.

As to the second feature, the wheel assembly is shifted or adjusted when it is desired to add the necssary weight to the draft unit to give it the necessary tractive effort to move the trailer and its contained load. Hence, if when the body is loaded it is found that the draft unit does not have the tractive effort sufficient to move the load, the wheel assembly is adjusted more to the rear of the trailer frame to shift at least a part of the weight of the load to the draft device.

As to the third feature, it is possible (within limits) to get the best angle of tilt for discharging a given type of load from the trailer body.

The pivotal hitch frame imparts the necessary component of movement to the trailer body to move it into and out of its dumping position either through the power of the draft unit or through the drum and cable arrangement. The pawl and ratchet device enables the trailer body to be held in tilted position while moving the trailer by the draft unit to better spread the load while dumping. The brakes of the wheels 2 may be set and released through the operation of a single lever and the same is true of the latch bolts for the adjustable wheel frame 24.

The latch mechanism for the side walls of the trailer body also contributes to the utility of the device in that a box or a platform body may be quickly and easily provided to accommodate any given type of load.

The adjustment of the wheel frame 24 with respect to the trailer frame is best accomplished by the power of the draft unit. This is done by backing up or moving the draft unit forwardly under its own power to slide the trailer frame on the wheel frame after the brakes for the wheels have been set and bolts released from th trailer frame.

The mechanism shown and described is sturdy and strong, yet simple and inexpensive in construction. It provides an effective two-wheeled trailer vehicle for both farm and industrial uses. The pivoted hitch makes possible the attachment of the trailer to either a tractor or a motor truck. The supplemental frame 12 extends below the main frame 11 so as to support the trailer body sufficiently above the wheels 2 for the side walls 4 to extend in a horizontal position over them when providing a platform body and to give clearance for the bolt actuating mechanism which is carried by the wheel frame below the trailer frames.

The details of construction and arrangement of parts shown and described may be variously changed and modified without departing from the spirit and scope of my invention except as pointed out in the annexed claims.

I claim as my invention:

1. In a two-wheeled trailer of the character described comprising in combination, a chassis frame, a trailer body carried by said frame, a wheel assembly for supporting the frame and the body, said chassis frame having side members and said wheel assembly having a frame having side members in sliding engagement with the side members of the chassis frame for adjustment of the wheel assembly longitudinally of the trailer body, locking bolts carried by the side members of the wheel assembly frame and engageable in spaced bolt openings in the side members of the chassis frame for locking the chassis frame to the wheel assembly frame in any adjusted position of the latter, and means carried by the wheel assembly and connected with said bolts for simultaneously actuating the same in locking and unlocking said frames.

2. In a two-wheeled trailer of the character described comprising in combination, a chassis frame, a trailer body carried by said frame, a wheel assembly for supporting the frame and the body, said chassis frame having side members and said wheel assembly having a frame having side members having sliding engagement with the side members of the chassis frame for adjustment of the wheel assembly longitudinally of the trailer body, locking bolts carried by the side members of the wheel assembly frame and engageable in spaced bolt openings in the side members of the chassis frame for releasably locking the frames in the adjusted positions of the wheel assembly frame, an actuating lever fulcrumed on the wheel assembly frame between the side members thereof, and a linkage connecting the bolts with the lever for simultaneous actuation thereby in locking and unlocking said frames.

3. In a two-wheeled trailer of the character described comprising in combination, a chassis frame, a trailer body carried by said frame, a wheel assembly for supporting the frame and the body, said wheel assembly having a frame having side members and the chassis frame having side members mounted on the side members of the wheel assembly frame in sliding engagement therewith for adjustment of the wheel assembly longitudinally of the trailer body, guide elements carried by the side members of one frame and co-acting with the side members of the other frame for holding the frames in connected relation for sliding adjustment, and a locking mechanism co-acting with the side members of both frames and operable through the guide elements therebetween for releasably locking the wheel assembly in its adjusted positions on the chassis frame.

4. In a two-wheeled trailer of the character described comprising in combination, a chassis frame, a trailer body carried by the frame, a wheel assembly for supporting the frame and the body, said frame having side members and said wheel assembly having a frame having side members in sliding engagement with the side members of the chassis frame for adjustment of the wheel assembly longitudinally of the trailer body, guide elements in the form of plates carried by the side members of the wheel assembly frame and overlapping the side members of the chassis frame for holding the frames in connected relation for sliding adjustment, locking bolts extending through the plates carried by the wheel assembly frame and engageable in spaced bolt openings in the associated side members of the chassis frame for locking the frames in their positions of adjustment, means connected with the bolts for simultaneously locking and unlocking the same, and supports for the bolts between the guide plates and carried by one of the same.

5. In a two-wheeled trailer of the character described comprising in combination, main and supplemental chassis frames, a trailer body carried by said frames, said frames having substantially parallel side members extending lengthwise of the trailer body with the side members of the main frame outwardly of the side members of the supplemental frame and extending substantially the full length of the trailer body, a wheel assembly having a frame having side members in sliding engagement with the side members of the supplemental frame for adjusting the wheel assembly longitudinally of the trailer body, locking elements releasably connecting the side members of the wheel assembly frame to the side members of the supplemental frame in any adjusted position of the frames, and means carried by the wheel assembly and connected with the locking elements for simultaneously locking and unlocking the same.

ELMER J. LEX.